Figure 2:
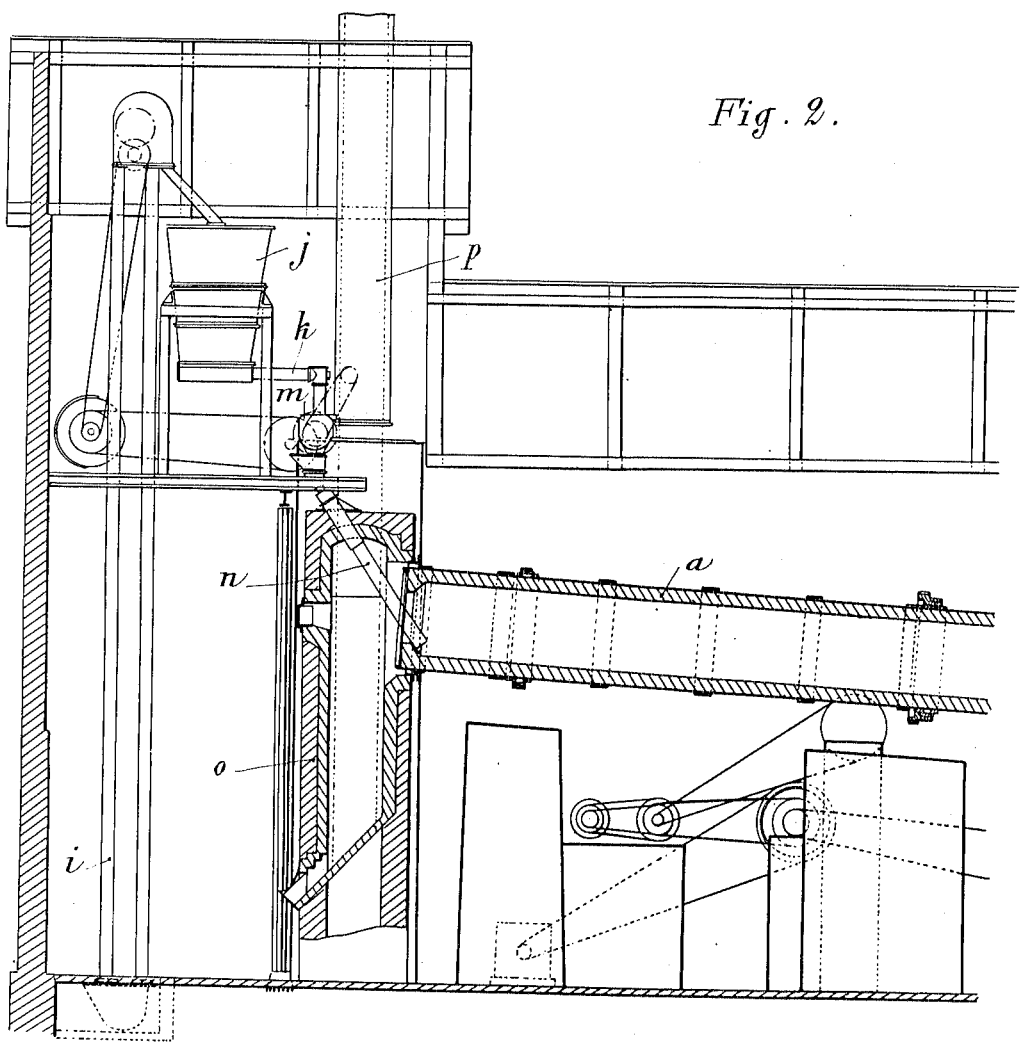

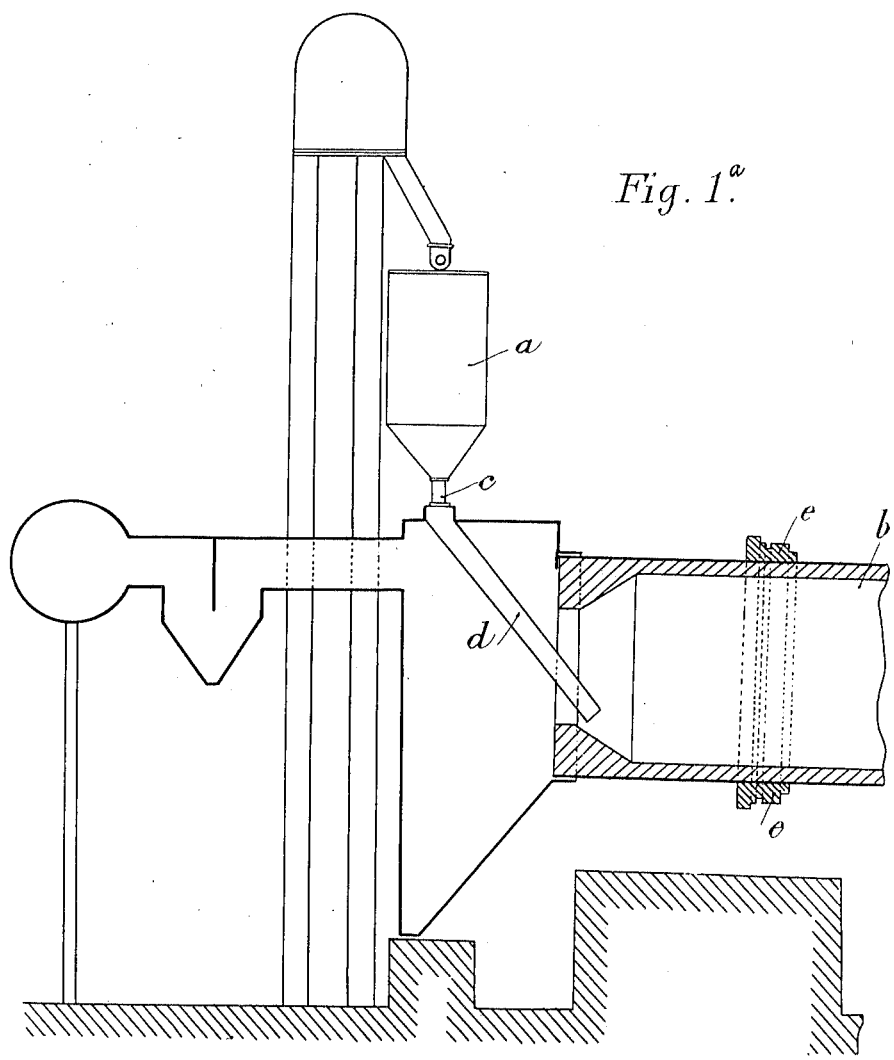

B. JUNQUERA.
PROCESS FOR TREATMENT OF MINERALS AND EXTRACTING METAL.
APPLICATION FILED DEC. 18, 1908.
1,102,339.
Patented July 7, 1914.
4 SHEETS—SHEET 4.
Fig. 2.ª
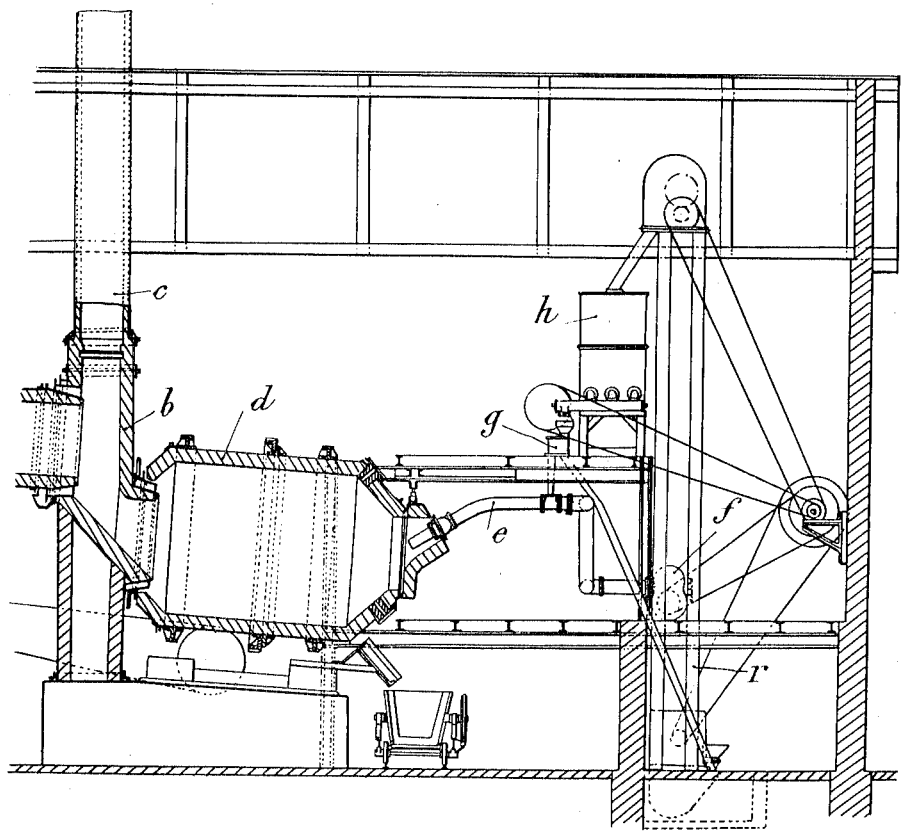
WITNESSES
W. P. Burke
Chas. G. Smith
INVENTOR
Buenaventura Junquera
BY
M. Mullan White
ATTY.

UNITED STATES PATENT OFFICE.

BUENAVENTURA JUNQUERA, OF OVIEDO, SPAIN.

PROCESS FOR TREATMENT OF MINERALS AND EXTRACTING METAL.

1,102,339.

Specification of Letters Patent.

Patented July 7, 1914.

Application filed December 18, 1908. Serial No. 468,230.

*To all whom it may concern:*

Be it known that I, BUENAVENTURA JUNQUERA, subject of the King of Spain, residing at Santa Susana 5, Oviedo, Spain, have invented new and useful Improvements in Processes for Treatment of Minerals and Extracting Metal, of which the following is a specification.

The present invention consists of a process for the smelting of ores of such metals (iron, copper, etc.) as are not volatile even at a temperature of 800 degrees C.

In the prior art, smelting has generally been performed in a vertical blast furnace whose construction and operation is, as every one knows, a complicated and exceedingly expensive matter, and which has also other disadvantages (repairs possible only at a great expense, etc.). Moreover, friable ores could be smelted in said furnace only after previous formation of patent fuel, or agglomeration. The calcination and reduction of the ores, which were necessarily in lumps, took place slowly because the hot and reducing gases have difficulty in penetrating the lumps, no matter how porous the latter may be. Now, it has been found out that, in the case of ores whose metals do not become volatile even at a temperature of 800 degrees, this type of furnace and its service may be entirely dispensed with if the ore is not used in the form of lumps, but if same, before being smelted, is ground and triturated together with its fluxes to the highest degree of fineness,—if possible, to the fineness of an impalpable powder,—and if the so finely ground charge is then heated in a rotary type of furnace in the manner described below.

In principle, therefore, the invention consists in disintegrating the ore and its fluxes to as high a degree of fineness as possible (the fluxes may be ground separately and may then be mixed with the ground ore; or they may be ground jointly with the ore) and in then treating the ground mixture in an inclined rotary blast-furnace.

The application of this new process to a mineral such as an oxid, the oxid of iron, for example, comprises the following operations: 1°. Pulverization to an impalpable state of a mixture of the oxid and the flux with the carbon or fuel necessary for reduction. 2°. Raising of the temperature of this ing carbon, and flux) after being disintegrated and mixed, are led by an elevator $i$ into a ture, after the accomplishment of the reduction, the temperature being sufficiently great not only for the fusion of the metal, but also for the formation of slag by the flux and the constituents of the residue. The first operation, that is the disintegration, can be performed with any suitable known apparatus. The second and third operations (reduction and fusion) should follow, and take place in a single piece of apparatus, in such a manner that the heat in excess of that required in the fusion can be utilized to raise the temperature of the succeeding pulverized mixture.

Figure 1:
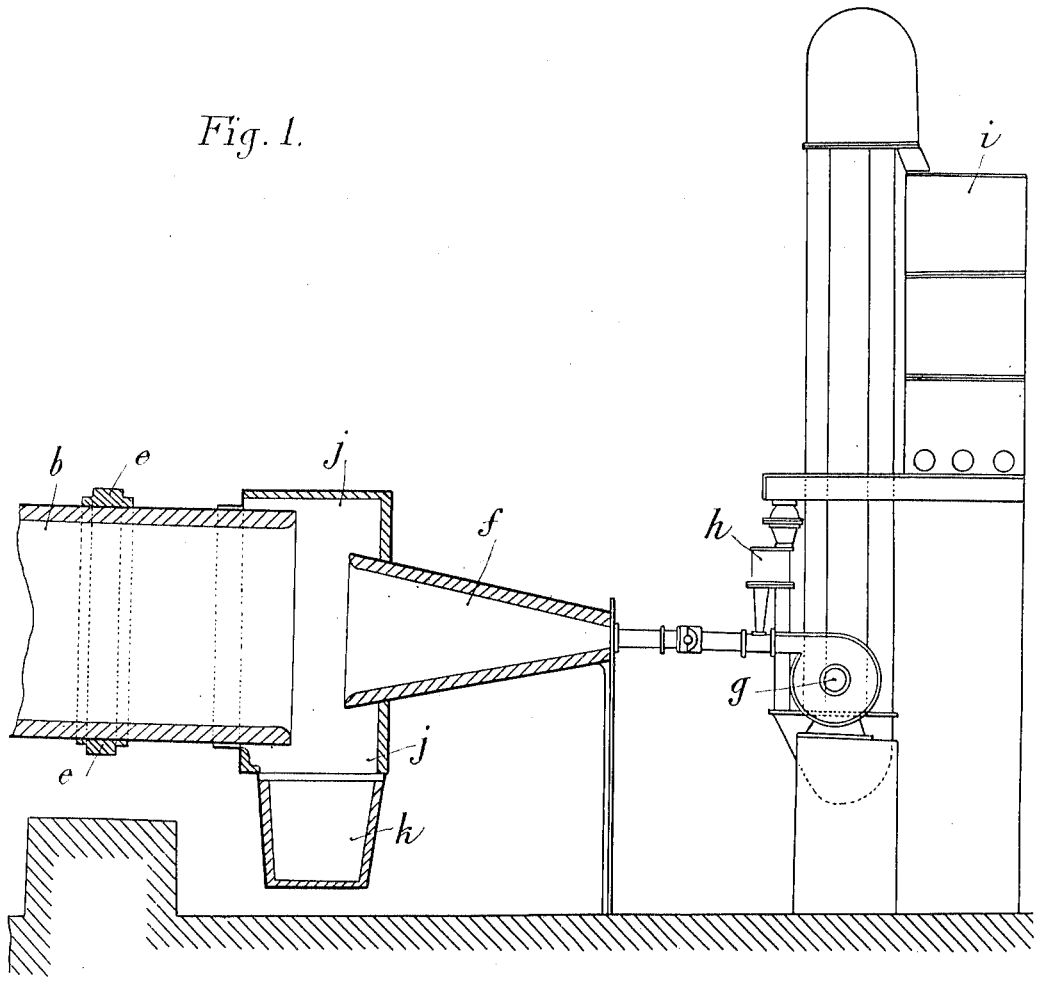

An apparatus for carrying out the invention is shown in the accompanying drawings, in which:

Figures 1 and 1ª show a sectional view of one form of apparatus, while Figs. 2 and 2ª show a sectional view of another form of apparatus.

The apparatus shown in Fig. 1 comprises a tubular rotary furnace $b$, provided with a burner for powdered fuel; a contrivance $a$—$c$—$d$ for maintaining a continuous and regular feed of the mixture to be treated, and a collecting crucible $k$ for the molten products (iron and slag). The materials to be treated are led, by means of an elevator, into a receiver $a$, whence the pulverized mixture is fed regularly and continuously into a tubular rotary furnace $b$, by means of a distributer $c$ and a chute $d$. The rotary furnace $b$ has a length of from twenty to thirty meters; it is lined on the inside with refractory material. It rests by means of rings $e$ on rollers in such a manner as to be capable of being revolved around its axis at a speed which can be varied. Owing to its inclination of from 3 to 5 degrees, the material introduced at its upper extremity is transferred to the lower extremity by a gradual movement along the tube as a traveling stream. The lower extremity of the furnace opens into a refractory chamber $j$, at the bottom whereof is situated the collecting crucible $k$, and into the wall of which debouches also the blast tube $f$ of a burner fed with powdered or fine fuel, taken from a receiver $i$, and led by a distributer $h$ into a discharge pipe of a fan $g$.

The apparatus works as follows:—The burner having been ignited, and the interior of the rotary furnace being at a suitable temperature, the mixture of the mineral, the carbon for reduction, and the pulverized flux is admitted; this mixture progresses as a thin traveling stream along the bottom of the tubular furnace in which its temperature is gradually raised, as it passes below the current of hot gases. The reduction of the pulverized mineral in intimate contact with the reducing carbon which is also in a powdered state is easily and rapidly brought about as soon as the temperature reaches 600° or 800°; at the same time, the lime or other flux reacts on the silica and other impurities in the mineral. The carbon combining with the oxygen of the mineral forms carbonic oxid or carbonic acid. The rapidity of this action increases in proportion to the minuteness of subdivision of the materials mixed. In practice the material can be broken up so finely that there is only from eight to ten per cent. of residue on a sieve with a mesh of 4900 perforations per sq. centimeter. At a temperature of eight hundred degrees the materials thus pulverized react rapidly on one another. The mixture of reduced metal and flux together with traces of the carbon next reaches the high-temperature zone (1,500° to 1,600°) at which the fusion of the metal more or less carburized occurs, and the formation as well as the fusion of the slag take place. The metal and the slag drop into the crucible $k$ where they are separated by difference of density. During the whole progress of this operation, the atmosphere in the tubular furnace is substantially devoid of free oxygen provided that the combustion of the pulverized carbon, takes place with only sufficient air to produce carbonic acid; moreover the temperature of the fusion zone will be always above 1,500°, so that the atmosphere of the furnace will only be composed of nitrogen, carbonic acid, and a very little carbonic oxid arising from the reduction of the oxid of iron, or the action of the carbonic acid of the burner on the carbon. For many minerals the operations of reduction, fusion and refinement cannot be carried out as conveniently in the simple furnace so constructed and a more special type is better. The three operations necessitate indeed different conditions of temperature and time. The refinement of a metal may occupy a much longer period than the fusion and reduction of new charges; further, after fusion, there is danger of the unreduced metal receiving a harmful excess of heat from the lower part of the apparatus. The apparatus represented in Fig. 2 avoids these disadvantages and is divided into three parts: a reduction chamber, connected to an intermediate chamber, from which any harmful excess of heat, coming from the third part of the apparatus, which forms the fusion and refining chamber, can be diverted from the system at will. The materials (mineral, reducing carbon, and flux) after being disintegrated and mixed, are led by an elevator $i$ into a receiver $j$, from which a mechanical distributer $k$ pours them into a moistener $m$ where they form nodules and are caused to descend by a tube $n$ into the tubular rotary reducing furnace $a$, where the reduction of the oxid contained in the pulverized fusion mixture takes place. The reduction is effected as soon as the temperature reaches 700° to 800°. At this moment the substance containing the separated metal should be expelled from the reduction chamber $a$ in order to pass into a fusion chamber $d$ after traversing the intermediate fixed part $b$ of the apparatus. As has been said above, the fusion of the metal, and the fusion and combination of the substances serving to eliminate the impurities necessitate a supply of heat such that the excess is more than sufficient to raise to a temperature of 800° the new charge entering the reducing chamber. The intermediate fixed part $b$ permits of the elimination of all the excess of heat. For this purpose the intermediate chamber $b$ is provided with a chimney $c$ by which the hot gases in excess escape, a regulator of any known form allowing the escape to be controlled at will so that the temperature in $a$ never exceeds 800°. The reduced metal and the flux reach the rotary furnace $d$, which is adjacent to the intermediate fixed chamber $b$. It is in this furnace $d$ that fusion, the formation of slag, and the elimination of impurities take place; in this third part of the apparatus which may be called the crucible and converter of the furnace, the molten metal and slag accumulate. Owing to the rotary movement of the apparatus, and to the very high temperature developed by the fine fuel burner $e$ (this temperature, even with cold air, theoretically reaches 2,400° centigrade), the reactions will take place easily and energetically. The burner $e$ is fed with dust-like coal or carbon from the reservoir $h$ to which it is conducted by an elevator $r$. The carbon introduced into this reservoir is led by a distributer $g$ to a pipe $e$, mixed with air in measured quantities by means of a fixed-feed air supplying apparatus $f$, such as Root's blower.

The reduction furnace $a$ opens at its upper end into a dust collecting chamber $o$ surmounted by a chimney $p$. All the reactions take place in this chamber in an atmosphere mainly composed of carbonic acid and nitrogen, because the combination of pulverized carbon, with merely a sufficient quantity of air, gives rise to no other products. In addition, it is easy with known apparatus or with a regulator for the distribution of air and carbon, to obtain with such a burner perfect combustion without any excess of air. Perfect combustion insures the complete utilization of the fuel which in this way develops 8080 calories per kilogram of carbon.

The advantages of the process and apparatus described are shortly these: 1°, the easy and rapid reduction of the mineral, which is brought about by direct contact, the mineral and the carbon being mixed in some way when in a very finely divided state: 2°, the perfect combustion of the pulverized coal, allowing of the complete utilization of the total calorific power of the fuel employed: 3°, the reduction to a minimum of the losses of heat by radiation, the apparatus having only a small exterior surface: 4°, the rapidity with which all the reactions necessary for reduction and fusion are effected. Finally it is necessary to observe that, in a single operation and with a greatly reduced fuel consumption, a result is obtained with a single piece of apparatus, which result with known processes necessitates two long and costly operations. With the new process iron mineral can in twenty minutes be converted into molten iron or steel containing 0.10 per cent. of carbon or more, the process being carried on continuously and in a manner automatically. Another advantage possessed by this process is that the fuel need not satisfy any special conditions as in the known processes; any kind of coal may be employed, it being sufficient if it contains from 15—20% of volatile matter as regards the coal employed in the burner, or if it is slightly agglutinous as regards the reducing coal. On the other hand minerals, especially iron mineral need not satisfy any special conditions with regard to richness and composition; once reduced to an impalpable powder, they can, whatever their nature, be considered as composed of a powder of pure oxid of iron, mixed with powdered impurities. In this state of division all oxids are equally available, and their reduction by carbon is effected with equal facility, whatever may be their nature; the only difference between a rich and a poor mineral being in the quantity of residue, and consequently of slag, formed and melted, which represents only a slight increase in fuel in the fusion furnace. This increase is of small importance, seeing that the calorific power of the fuel is, as has been said above, wholly utilized in the burner.

The consumption of fuel for converting iron mineral of moderate richness, say 48 to 50 per cent. of metallic iron, is about 1000 kilograms per ton of metal obtained of which 600 kilograms approximately correspond to the reducing carbon, supposing that this carbon employed has the effect of converting the greater part of the carbon into carbonic oxid, while 400 kilograms of pulverized carbon are utilized for combustion in the burner. This consumption supposes that the carbon contains from 25 to 30% of volatile matter, in which case the gases produced by the reduction of the oxid and the distillation of the carbon, possesses on leaving the reduction furnace a calorific value of 3,072,000 calories, which, added to the calories carried away with the inert gases and by the excess of heat from the fusion furnace (which can be recovered), represents a greater heat than that produced in the fine fuel burner. This gas burnt in the fusion furnace with the aid of air heated by the excess heat, should more than replace the 400 kilograms of fuel which are used in this part of the apparatus, so that the consumption of fuel per ton of metal obtained may be diminished to that of the carbon used for reduction, that is to say to the small quantity of 600 kilograms per ton of malleable metal obtained. This is a measure of fuel economy unattained by any process known up to the present.

I claim:

1. The herein described process of smelting ores of metals which are not volatile at a temperature of 800 C., which comprises reducing such an ore, a reducing agent and a flux to impalpable powders, making an intimate mixture of these materials with the reducing agent present in at least a proportion sufficient for reducing the metal and then subjecting this mixture as a traveling stream to the action of an overlying current of fire gases at a high temperature.

2. The process of producing metals which comprises producing a mixture of impalpably fine ore, flux and reducing carbon, transmitting said mixture as a traveling stream against a stream of fire gases substantially free from oxygen until reduction is complete, and then raising the temperature to the fusion point of the metal produced.

3. The process of producing metal which comprises pulverizing ore, fuel and flux to impalpable powder, subjecting a traveling layer of a mixture of the same to a temperature around 800° C. by means of overlying fire gases substantially free of oxygen until reduction is complete and then bringing the reduced mixture to a molten condition by fire-heating means, said fire gases being derived from said fire heating means.

In testimony whereof I have signed my name to this specification in the presence of two subscribing witnesses.

BUENAVENTURA JUNQUERA.

Witnesses:
EMILY BERTID,
H. C. COXE.